United States Patent
Staelgraeve et al.

(10) Patent No.: US 6,726,980 B2
(45) Date of Patent: Apr. 27, 2004

(54) ACOUSTIC DOORLINER WITH INTEGRAL WATER BARRIER

(75) Inventors: Lee A. Staelgraeve, Lambertville, MI (US); Thomas T. Block, Howell, MI (US); Dan Eigel, Louisville, KY (US)

(73) Assignee: Owens Corning Fiberglass Technology, Inc., Summit, IL (US)

( * ) Notice: Subject to any disclaimer, the term of this patent is extended or adjusted under 35 U.S.C. 154(b) by 9 days.

(21) Appl. No.: 10/040,697

(22) Filed: Nov. 9, 2001

(65) Prior Publication Data

US 2003/0091806 A1 May 15, 2003

(51) Int. Cl.$^7$ .............................................. B32B 23/02
(52) U.S. Cl. ....................... 428/192; 428/218; 428/156; 428/171; 428/177; 428/297.4
(58) Field of Search .............................. 418/218, 304.4, 418/309.9, 297.4, 316.6, 192, 156, 171, 177, 141, 157, 161, 174, 170

(56) References Cited

U.S. PATENT DOCUMENTS

| 4,131,664 A | * | 12/1978 | Flowers et al. | 264/510 |
|---|---|---|---|---|
| 4,824,507 A | * | 4/1989 | D'Amico | 156/245 |
| 4,940,112 A | * | 7/1990 | O'Neil | 181/290 |
| 4,985,106 A | * | 1/1991 | Nelson | 156/276 |
| 5,741,380 A | * | 4/1998 | Hoyle et al. | 156/62.6 |
| 5,932,331 A | * | 8/1999 | Jones et al. | 428/218 |
| RE36,323 E | * | 10/1999 | Thompson et al. | 181/286 |
| 6,312,542 B1 | | 11/2001 | Nagata et al. | |

FOREIGN PATENT DOCUMENTS

| DE | 42 11 409 | 7/1993 |
|---|---|---|
| EP | 909 680 | 4/1999 |
| GB | 226 5569 | 10/1993 |

\* cited by examiner

*Primary Examiner*—Merrick Dixon
(74) *Attorney, Agent, or Firm*—Inger H. Eckert; Stephen W. Barns

(57) ABSTRACT

An acoustical liner with integral water barrier is provided. The liner includes a pad of fibrous material having a lofty, acoustically insulating portion and at least one heat-seared face of relatively higher density to provide water barrier protection. The acoustical liner is a non-laminate made from polyester, fiberglass, polypropylene and any mixtures thereof. A method of insulating a door including an exterior body panel and an interior fascia panel as well as a door for a vehicle are also disclosed and claimed.

5 Claims, 2 Drawing Sheets

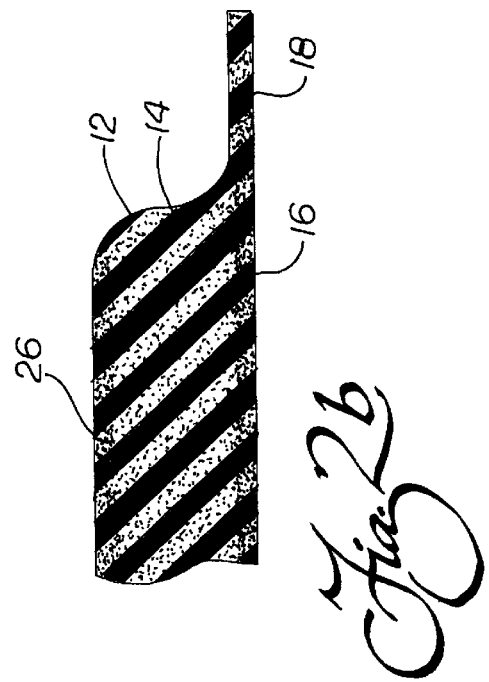
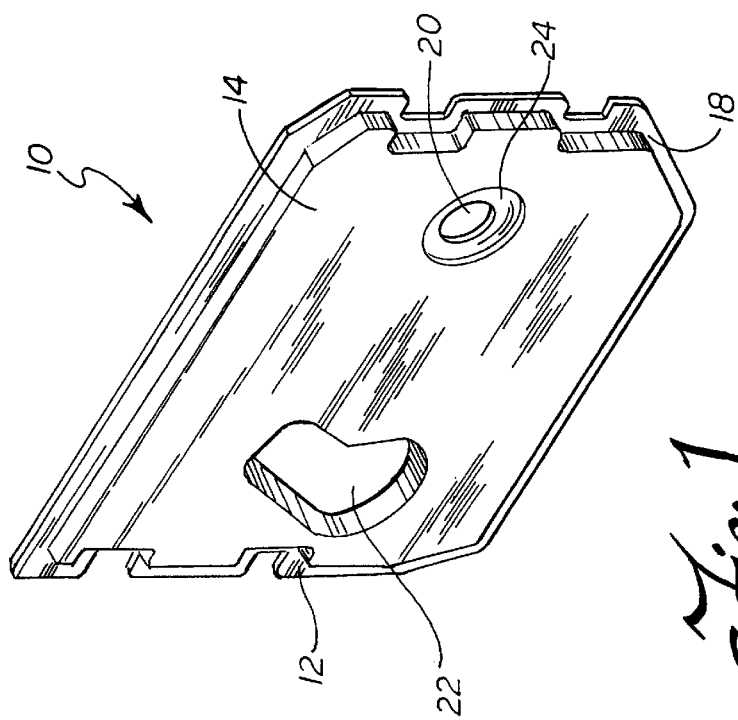

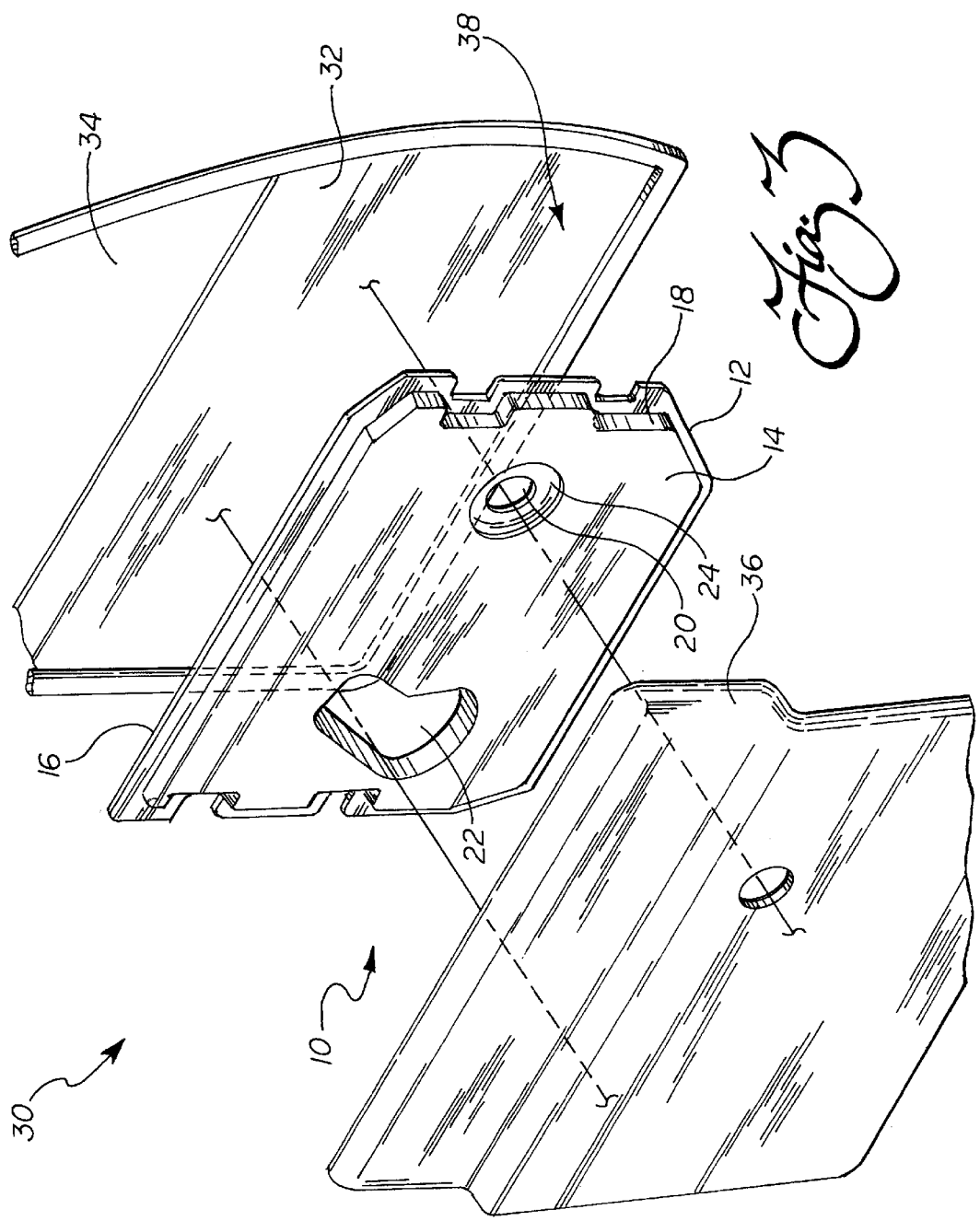

ACOUSTIC DOORLINER WITH INTEGRAL WATER BARRIER

TECHNICAL FIELD AND INDUSTRIAL APPLICABILITY OF THE INVENTION

The present invention relates to the field of acoustical insulation and, more particularly, to acoustical insulation with an integral water barrier.

BACKGROUND OF THE INVENTION

Acoustical insulation is well known in the art. Acoustical insulation typically relies upon both sound absorption, i.e. the ability to absorb incident sound waves, and transmission loss, i.e. the ability to reflect incident sound waves, in order to provide sound attenuation. One of the more prevalent uses of such insulation is in the motorized vehicle field where engine compartments, fire walls, fender wells, doors, floor panels and other components of the passenger compartment shell are commonly acoustically insulated to reduce engine and road noise for the benefit and comfort of passengers.

Examples of acoustical insulation commonly employed for vehicle applications are found in U.S. Pat. Nos. 5,298,694 to Thompson et al., 5,624,726 to Sanocki et al., 5,759,659 to Sanocki et al. and 5,961,904 to Swan et al.

The 5,298,694 patent discloses a non-woven acoustical insulation web of thermoplastic fibers and a second layer, such as a scrim, non-woven fabric, film or foil, laminated thereto for water barrier protection.

The 5,624,726 and 5,759,659 patents disclose an acoustical insulation blanket in the form of a composite featuring an insulation layer of fibrous insulation, foam insulation or a combination thereof and a high temperature-resistant layer of ceramic paper, woven ceramic fibers, woven fiberglass fibers, ceramic non-woven scrims or fiberglass non-woven scrims encased in a heat sealable thermoplastic polyolefin which functions as a moisture barrier.

The 5,961,904 patent discloses a non-woven acoustical insulation web of thermally stabilizing melt-blown polypropylene microfibers which may also contain staple fibers such as crimped bulking fibers and/or binder fibers. The acoustical insulation web is formed as a laminate with a water barrier layer of planer thermoplastic polyolefin film such as polyethylene, polypropylene and ethylene-propylene copolymer films.

In many acoustical insulation applications and particularly those relating to motorized vehicles, water barrier protection is an important concern. As demonstrated by these prior art patents it has generally been found necessary to add water barrier protection to the acoustical insulation material which is pervious to water and may allow water intrusion into the vehicle passenger compartment. Typically it has been necessary to provide laminate constructions which are effective for the intended purpose but suffer several shortcomings. Specifically, delamination may occur as a result of handling and manipulation during installation or various environmental factors. Delamination typically reduces the effectiveness of the water barrier thereby potentially allowing for unwanted water intrusion into the interior of the vehicle. A need is therefore identified for an improved acoustical insulation providing dependable water barrier protection over an extended service life.

SUMMARY OF THE INVENTION

In accordance with the purposes of the present invention as described herein, an acoustical liner with integral water barrier is provided. The acoustical liner is formed with a pad of fibrous material having a lofty, acoustically insulating material having at least one heat-seared, water-barrier face. The fibrous material preferably has a density of between about 0.6–4.0 lbs/ft$^3$ with the heat sealed face having a thickness of between about 0.01 and 5.0 mils. The pad may be formed from fibrous materials such as polyester, fiberglass, polypropylene and any mixtures thereof or other suitable fibers. The pad and heat-seared, water-barrier face are integral and, accordingly, the acoustical liner is a non-laminate. As such, it avoids the tendency to delaminate which is characteristic of the water barrier layers laminated to acoustical insulation materials of the prior art.

The acoustical liner with integral water barrier may further include a crimped margin around at least a portion of the periphery of the pad where the crimped margin has a thickness of at least about 0.5–3.0 mm. This margin provides additional strength and a suitable location to mount the liner to a structural component of a vehicle, such as a door panel, which requires acoustical insulation with water barrier protection, by known fasteners.

The pad of the acoustical liner with integral water barrier may also include two heat-seared faces.

In accordance with yet another aspect of the present invention a method of insulating a door including an exterior body panel and an interior fascia panel defining a cavity therebetween is provided. The method comprises the placing of a pad of fibrous material in the cavity between the exterior body panel and the interior fascia panel. The pad has a lofty, acoustically insulating portion having a density of between about 0.6 and 4.0 lbs/ft$^3$ and at least one heat-seared face having a density of between about 0.01 and 5.0 mils.

In accordance with yet another aspect of the present invention a door for a vehicle is provided. The door includes an exterior body panel, an interior fascia panel connected to the exterior body panel and defining a cavity therebetween and a pad of fibrous material having a lofty, acoustically insulating portion having a density of between about 0.6 and 4.0 lbs/ft$^3$ and at least one heat-seared, water-barrier face having a thickness of between about 0.01 and 5.0 mils. The pad may be formed from fibrous materials selected from a group consisting of polyester, fiberglass, polypropylene and any mixtures thereof. The pad is not a laminate and may also include a crimped margin around at least a portion of the periphery of the pad where the crimped margin has a thickness of between about 0.5 and 3.0 mm. As noted above, this crimped margin provides a convenient fastening point for securing the acoustical liner to the exterior and/or interior panels of the component to which the acoustical liner is to be secured. The pad of the acoustical liner may also include two heat-seared faces. Of course, the door may also include a window.

Still other objects of the present invention will become apparent to those skilled in this art from the following description wherein there is shown and described embodiments of this invention, simply by way of illustration of two modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention, and together with the description serves to explain the principles of the invention. In the drawing:

FIG. 1 is a perspective view of an acoustical liner with integral water barrier of the present invention;

FIG. 2a is a detailed cross-sectional view of the acoustical liner shown in FIG. 1 having a single heat-seared face;

FIG. 2b is a detailed cross-sectional view of an alternative embodiment of the present invention showing an acoustical liner with two, opposed heat-seared faces; and FIG. 3 is an exploded perspective view of a vehicle door constructed in accordance with the teachings of the present invention.

Reference will now be made in detail to the present embodiments of the invention, examples of which are illustrated in the accompanying drawings.

DETAILED DESCRIPTION OF THE INVENTION

Reference is now made to FIG. 1 showing the acoustical liner 10 of the present invention. The acoustical liner 10 includes a pad 12 of fibrous material. The pad 12 is constructed from material characterized by the ability to absorb incident sound waves and the ability to reflect incident sound waves so that the material provides excellent sound attenuation. The pad 12 may be constructed from any suitable fibrous material, for example: polyester, fiberglass, polypropylene and any mixtures thereof.

As shown in FIG. 2a, the pad 12 includes a lofty, acoustically insulating portion 14 having a density of between about 0.6 and 4.0 lbs/ft$^3$ and a heat-seared face 16 of increased density that resists water permeation and functions as a water barrier. The face 16 has a thickness of between about 0.01 and 5.0 mils and preferably has a density of between about 4 and 100 lbs/ft$^3$.

The insulating portion 14 and face 16 are integrally formed during the manufacturing process and as such the liner 10 is a shingle piece. Since the liner 10 does not comprise layers it does not delaminate and, therefore, provides reliable water-barrier protection and acoustically insulating properties over a long service life.

A crimped margin 18 is provided around at least a portion of the outer periphery of the pad 12. The crimped margin 18 may have a thickness of between about 0.5 and 3.0 mm. The material in the crimped margin 18 is compressed to a relatively higher density than insulating portion 14. The crimped margin 18 is better suited to hold mechanical fasteners (not shown) such as screws and plastic snap rivets utilized to secure insulation sheeting to vehicle panels or the like.

As shown, the liner 10 may also include various cutout openings 20, 22 in the body thereof to accommodate door operating structures such as door latch handles and window operating mechanisms. A crimped margin 24 similar to the crimped margin 18 may be provided around one or more of these openings and has been illustrated in the drawing FIG. 1 around the opening 20.

In an alternative embodiment of the liner 10, shown in FIG. 2b, a second, heat-seared face 26 is provided opposite the first, heat-seared face 16. While not explicitly shown, it should be appreciated that the edges of the liner 10 may also be heat-seared in order to enhance water-barrier protection in applications where water-barrier protection is of importance.

The construction of a door 30 of a vehicle is shown in FIG. 3. The door 30 generally comprises an exterior body panel 32 including a window opening 34 and an interior fascia panel 36. A cavity 38 is defined between the two panels 32, 36 when they are secured together. A liner 10 of the type described above and shown in detail in FIGS. 1, 2a or 2b including a pad 12 having a lofty, acoustically insulating portion 14 and at least one heat-seared, water-barrier face 16 is placed in the cavity 38. More specifically, the liner 10 may be secured by mechanical fasteners or other means of a type known in the art to either the exterior panel 32 or the interior panel 36 of the door.

A number of different techniques may be utilized to manufacture the liner 10 of the present invention. The liner 10 may be prepared by differential heating and uniform compression. Specifically, one side of the blanket or pad of insulation material, i.e. the side to include the heat-seared, water-barrier face, is heated while the other side remains relatively cool. A pressure is then applied for sufficient time to allow the polymer binding fiber to soften near the hot surface but not near the cold surface.

When this occurs under compression, the hot side is reshaped into a higher density layer. The cool side of the polymer binding fiber does not soften and, therefore, when the pressure is removed, it retains most of its original thickness and density characteristics. This technique may be performed in a standard molding press where one platen runs hot and the other runs cool.

In an alternative technique, two polymer binding fibers having significantly different softening points are utilized. In one approach, two separate blanket layers are produced each utilizing a different softening point polymer fiber. The two layers are brought together in a molding operation utilizing differential heating and compressed to a given gap width for a given length of time and at a given temperature differential. The blanket layer with the lower softening point polymer binding fiber is placed next to the hot platen and the higher softening blanket layer is placed next to the cool platen. When compression occurs, a higher density layer or skin is formed from the lower softening point blanket layer while the higher temperature layer is unaffected and retains its original density. The layers are otherwise fused so as to have an integral construction.

In an alternative approach, the blanket layer with the higher melting point polymer fiber is preformed and then that layer is fed back through the forming oven during formation of the lower melting point blanket. Since the oven is running at a temperature cooler than that required to activate the higher softening polymer binding fiber, it undergoes compression in the oven but retains its original thickness and density upon exiting the oven. The lower softening point material also undergoes compression and since the oven is at a temperature sufficient to activate its polymer binding fiber, it is squeezed down to a high density layer, and the two layers are fused together as one.

Further additional details of the various forming processes that may be utilized to manufacture the acoustical liner 10 of the present invention are disclosed and described in co-pending U.S. patent application Ser. No. 09/607,478, entitled "Process For Forming A Multilayer, Multidensity Composite Insulator", filed on Jun. 30, 2000. The full disclosure of this co-pending U.S. patent application is hereby incorporated herein by reference.

The foregoing description of two possible embodiments of the invention have been presented for purposes of illustration and description.

It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed:

1. An acoustical liner with integral water barrier, comprising a pad of fibrous material having a lofty, acoustically insulating portion having a density of between substantially 0.6–4.0 lbs/ft$^3$ and at least one water-barrier face formed of heat seared polymer fiber having a thickness of between substantially 0.01–5.0 mils and a density of between approximately 4.0–100.0 lbs/ft$^3$.

2. The acoustical liner with integral water barrier of claim 1, wherein said pad is formed from fibrous material selected from a group consisting of polyester, fiberglass, polypropylene and any mixtures thereof.

3. The acoustical liner with integral water barrier of claim 1, wherein said pad is a nonlaminate.

4. The acoustical liner with integral water barrier of claim 1, further including a crimped margin around at least a portion of a periphery of said pad, said crimped margin having a thickness of about 0.5–3.0 mm.

5. The acoustical liner with integral water barrier of claim 1, wherein said pad includes two heat seared faces.

* * * * *